Jan. 2, 1945.     L. P. GODFREY     2,366,610
FRICTION CLUTCH
Filed Jan. 9, 1942     3 Sheets-Sheet 1

Inventor:
Lawrence Percy Godfrey

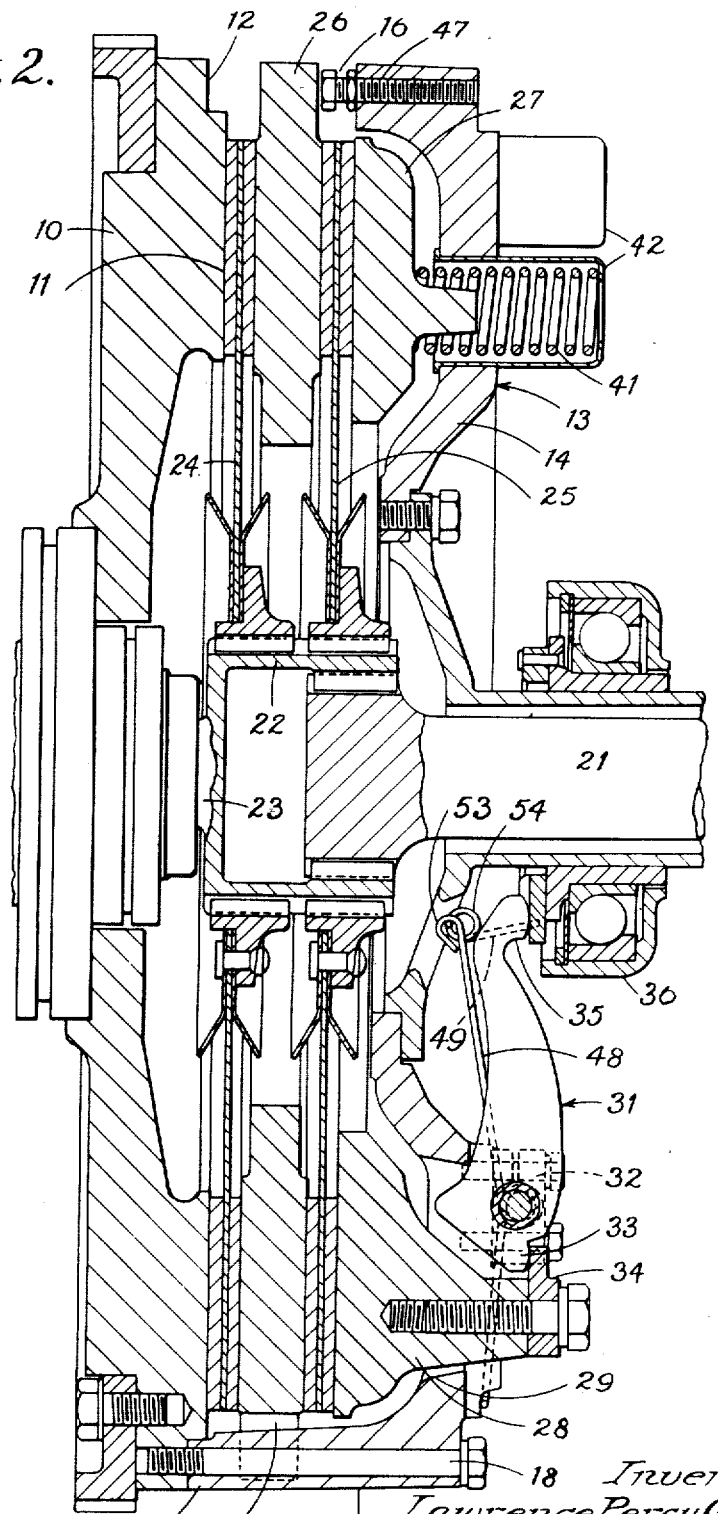

Jan. 2, 1945.          L. P. GODFREY                2,366,610
                       FRICTION CLUTCH
                    Filed Jan. 9, 1942          3 Sheets-Sheet 3
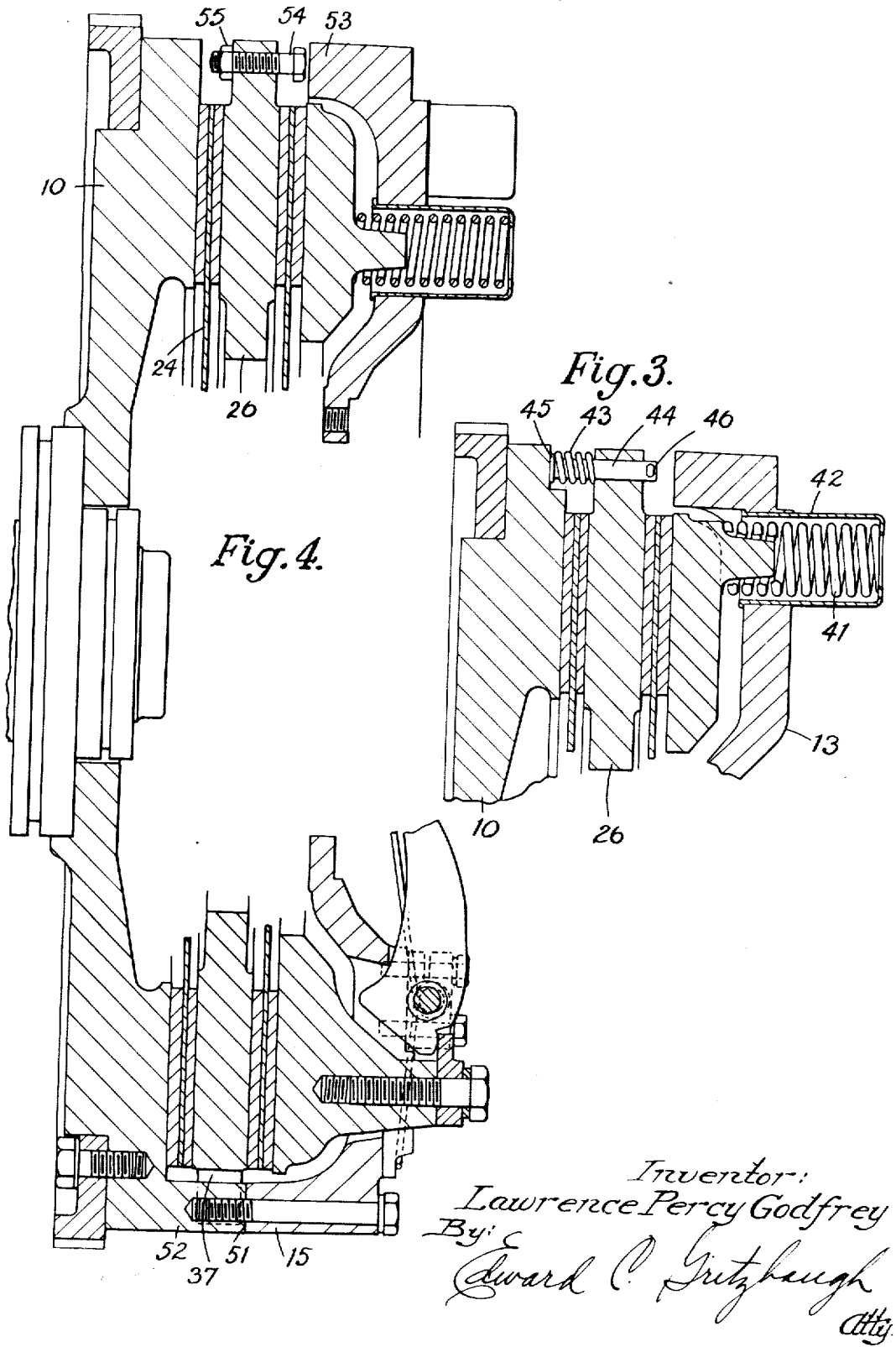

Patented Jan. 2, 1945

2,366,610

UNITED STATES PATENT OFFICE 2,366,610

FRICTION CLUTCH

Lawrence Percy Godfrey, Leamington Spa, England, assignor to Borg-Warner Corporation, Chicago, Ill.

Application January 9, 1942, Serial No. 426,159
In Great Britain January 27, 1941

6 Claims. (Cl. 192—69)

This invention relates to friction clutches, of the kind in which two driven discs or plates are arranged between a flywheel and a pressure plate, with an intermediate driving plate between the two driven plates, the clutch being enclosed by a casing comprising a substantially cylindrical wall extending from the flywheel to an annular end closure disc.

It has hitherto been customary to provide for rotational driving of the intermediate plate by means of inwardly projecting lugs or pins in the substantially cylindrical wall, such pins engaging with slots in the edge of the intermediate plate. Since the slots were necessarily formed in a part of the plate outside the radius of the friction surface, the intermediate plate had to be appreciably greater in diameter than the friction surfaces, the cover plate and flywheel being of even greater diameter. Such clutches were, therefore, considerably greater in overall diameter than their friction surfaces, with the result that a considerable amount of unnecessary space was occupied by them, and the object of the present invention is to provide a clutch having two driven plates in which the overall diameter for a given diameter of the friction surfaces is substantially decreased.

According to the invention, the substantially cylindrical wall is divided for at least a part of its length by a circumferential series of openings into a plurality of parallel-sided legs the edge of the intermediate plate projecting into the said openings and being cut away to accommodate the legs. The intermediate plate is thus capable of moving axially with relation to the cover plate, but cannot rotate relatively thereto. The substantially cylindrical wall may be integral with the annular end closure disc of the casing, or the part of said wall constituted by the parallel-sided legs may be integral with the flywheel. The end closure disc is preferably secured to the flywheel by a plurality of bolts, studs or equivalent extending parallel to the axis of the clutch and accommodated within the thickness of the wall extending between them. Stops for limiting the movement of the intermediate plate away from the flywheel may be provided in the openings in the substantially cylindrical wall, and the intermediate plate may be urged away from the flywheel by withdrawal springs also accommodated in said openings.

The invention is hereinafter described with reference to the accompanying drawings, in which:

Figure 2 is a section on the line 2—2 of Fig. 1;

Figure 3 is a fragmentary section on the line 3—3 of Fig. 1; and

Figure 4 is a section similar to Fig. 2, but with certain parts omitted, of an alternative form of clutch according to the invention.

Figure 1:
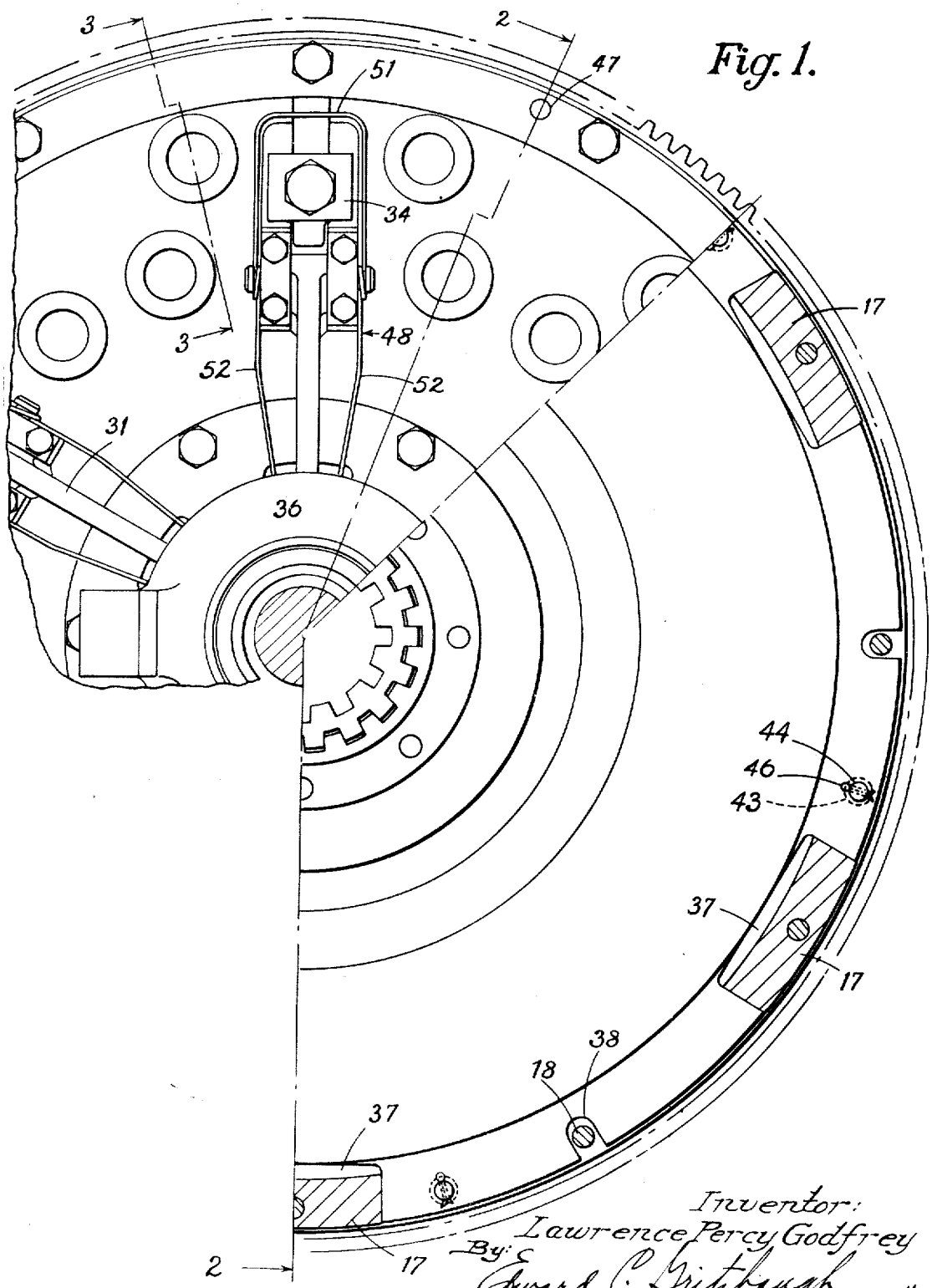
Figure 1 is a view partly in elevation and partly in section, looking from the rear of the clutch.

Referring to Figures 1 to 3 of the drawings, the clutch is mounted on a flywheel 10 formed with a flat annular face 11 to engage with one of the driven plates, and is reduced in thickness around such face to form a step 12. The cover plate 13 of the clutch comprises an annular disc portion 14 and a substantially cylindrical wall 15, the latter being circumferentially continuous at the part adjacent the annular disc portion 14, and being interrupted for the remainder of its length to form a circumferential series of openings 16 separated by legs 17. The ends of the legs 17 engage the step 12 on the flywheel 10 to locate the cover plate radially, and it is secured in position by a plurality of bolts 18 passing through the wall of the cover plate in an axial direction into threaded holes in the flywheel. A driven shaft 21 is splined into a cup-shaped carrier member 22 having a spigot 23 piloted in the flywheel centre, and on the carrier 22 are splined two driven plates 24 and 25, between which is mounted the intermediate plate 26. The pressure plate 27 is formed with six bosses 28, extending axially through slots 29 in the annular disc portion of the cover plate, these bosses 28 serving both to locate the pressure plate radially and circumferentially, and also to provide for the connection thereto of the release levers 31. These latter are pivotally mounted in bearings 32 on the exterior of the cover plate, and have radially outwardly extending arms 33 engaging the under surfaces of pads 34 secured to the end surfaces of the bosses 28. The inner ends 35 of the release levers co-operate with a release bearing 36 in the usual manner.

The cover plate has six legs 17 separated by an equal number of openings 16, the legs being of the order of half the width of the openings. The outer radius of the intermediate plate 26 is substantially equal to the outer radius of the cover plate 13, and the edge of the intermediate plate 26 is notched as at 37 to accommodate the legs of the cover plate, the notches being substantially equal in width to the legs 17 of the cover plate so that the two parts are substantially incapable of relative turning movement. Some of the bolts 18 which secure the cover plate to the flywheel pass across the openings in the cover plate, and pass through slots 38 in the intermediate plate 26.

The clutch is engaged by a series of springs 41 housed in sockets 42 mounted in the annular disc portion 14 of the cover plate, and bearing on the pressure plate 27 so that they urge the whole series of plates towards the flywheel to produce frictional engagement between them. When the clutch is released, the pressure plate 27 is drawn back by the release levers 31 to remove the engaging pressure from the clutch, and the intermediate plate 26 is urged away from the flywheel by a number of springs 43 mounted on posts 44 passing through the edge portion of the intermediate plate within the openings 16 in the cover plate, each post 44 having a head 45 abutting against the step on the flywheel, and the spring 43 being mounted between the said head and the intermediate plate. The extension of the springs is limited by split pins 46 passing through diametral holes in the post 44 and adapted to engage the side of the intermediate plate 26 remote from the flywheel. Adjustable stops to limit the movement of the intermediate plate 26 away from the flywheel are provided by set screws 47 mounted in the cover plate parallel to the axis of the clutch and projecting into the openings 16 in the side walls. Lock nuts on the set screws maintain them in any position to which they are adjusted.

The release levers 31 are held in contact with the pads 34 and the release bearing 36 by spring means including main U-shaped springs 48 and secondary U-shaped springs 49. The springs 48 have their bases 51 resting on the cover plate, and each leg 52 of each spring is coiled around one end of the pin upon which the associated lever is pivoted, the free ends of the spring extending towards the inner end of the lever. The bases of the U-shaped secondary springs pass through eyes 53 formed on the ends of the main springs, the legs of the secondary springs being formed into one or more coils as at 54, and having their free ends attached to the release bearing 36.

The driving connections for the intermediate plate, and also its axial locating means are thus all provided within the thickness of the cover plate, and the overall radius of the clutch is consequently greater than the radius of the friction surfaces only by substantially the thickness of the cover plate.

The intermediate plate, being urged away from the flywheel to a position limited by the stops 47, is positively spaced from the flywheel when the clutch is released, and is also prevented from following the retracting movement of the pressure plate beyond a certain amount, so that the flywheel, intermediate plate and pressure plate are positively separated, leaving the driven plates free and avoiding any appreciable drag in the clutch. The openings 16 in the wall of the cover plate permit a free flow of air through the clutch for cooling.

In the form of clutch shown in Fig. 4, the substantially cylindrical wall 15 of the cover plate terminates at 51, where it meets the ends of a plurality of legs or wall sections 52 projecting from the flywheel 10, and forming together an interrupted circumferential wall surrounding the driven plate 24 and intermediate plate 26. The notches 37 in the intermediate plate 26 embrace the legs 52, so that the said plate is compelled to revolve with the flywheel. The parts 53 of the wall 15 of the cover plate between the legs 52 are somewhat shorter than the parts which engage the legs, and these parts 53 serve as abutments for stops mounted on the intermediate plate to limit the movement of the latter away from the flywheel. These stops comprise bolts 54 screwed into the edge of the plate 26 and locked by nuts 55. The plate 26 is urged away from the flywheel by springs (not shown) corresponding to the springs 43 in Fig. 3. The legs 52 on the flywheel may be extended to project beyond the intermediate plate, the cover plate being then merely a substantially flat annular plate secured to the ends of the legs.

What I claim is:

1. In a friction clutch, a flywheel having a peripheral portion of reduced axial thickness defining a step, a substantially cylindrical wall comprising the outermost portion of the clutch, a closure formed integrally with said wall, said wall having a series of circumferentially separated openings defining between them a plurality of legs, the ends of said legs being piloted against said steps and securing elements extending through said legs and attaching the closure to the flywheel, and an intermediate driving member interposed between said outer driving member and said closure and encompassed within said substantially cylindrical wall, said intermediate driving member having circumferentially spaced lugs projecting radically outwardly into said openings, with the circumferential extremities of said lugs in driving engagement with the circumferential extremities of said legs.

2. In a friction clutch, an outer driving member, a closure member attached thereto, a substantially cylindrical wall bridging said outer driving member and said closure member and constituting the outermost portion of the clutch, said wall having a plurality of circumferentially spaced openings defining a plurality of legs bridging between said outer driving member and said closure member, an intermediate driving member and a pressure plate interposed between said outer driving member and closure member, said intermediate driving member having a plurality of lugs projecting radically outwardly into said openings and drivingly engaged with the circumferential extremities of said legs, said closure member having a radially extending portion provided with a plurality of axial openings, and said pressure plate having driving lugs extending axially through said axial openings in driving engagement with the circumferential extremities thereof.

3. A clutch as defined in claim 2, including means for limiting the separation of said outer and inner driving members, said means comprising a stop member interposed between a driving lug of said intermediate driving member and a peripheral portion of said closure member, said stop member being adjustably mounted in one of said two last-mentioned members and adapted to engage the other.

4. A friction clutch comprising an outer driving member, a closure member, a substantially cylindrical wall bridging said driving member and closure member and constituting the outermost portion of the clutch, and an intermediate driving member interposed between said outer driving member and closure member and encompassed within said cylindrical wall, said cylindrical wall having a plurality of circumferentially spaced openings defining between them a plurality of legs, and said intermediate driving members having a plurality of radially outwardly projecting lugs extending into said openings, with the circumferential extremities of said lugs in driving engagement with the circumferential extremities of said legs and means defining stop members carried by said lugs and projecting into said opening within the radii of said substantially cylindrical wall, said stop members being adapted to coast with said closure for limiting the movement of said intermediate member away from said outer driving member.

5. A friction clutch comprising an outer driving member, a closure member, a substantially cylindrical wall bridging said driving member and closure member and constituting the outermost portion of the clutch, and an intermediate driving member interposed between said outer driving member and closure member and encompassed within said cylindrical wall, said cylindrical wall having a plurality of circumferentially spaced openings defining between them a plurality of legs, and said intermediate driving member having a plurality of radially outwardly projecting lugs extending into said openings, with the circumferential extremities of said lugs in driving engagement with the circumferential extremities of said legs, means defining stop members carried by said closure member and disposed radially within the confines of said cylindrical wall within said opening and effective to limit the movement of said intermediate member away from said outer driving member.

6. A friction clutch comprising an outer driving member, a closure member, a substantially cylindrical wall bridging said driving member and closure member and constituting the outermost portion of the clutch, and an intermediate driving member interposed between said outer driving member and closure member and encompassed within said cylindrical wall, said cylindrical wall having a plurality of circumferentially spaced openings defining between them a plurality of legs, and said intermediate driving member having a plurality of radially outwardly projecting lugs extending into said openings, with the circumferential extremities of said lugs in driving engagement with the circumferential extremities of said legs, and withdrawal springs received in said openings within the radii of said substantially cylindrical wall effective for moving said intermediate member away from said outer driving member.

LAWRENCE PERCY GODFREY.

CERTIFICATE OF CORRECTION.

Patent No. 2,366,610. January 2, 1945.

LAWRENCE PERCY GODFREY.

It is hereby certified that error appears in the printed specification of the above numbered patent requiring correction as follows: Page 2, second column, line 31, claim 1, and line 47, claim 2, for "radically" read --radially--; and that the said Letters Patent should be read with this correction therein that the same may conform to the record of the case in the Patent Office.

Signed and sealed this 24th day of April, A. D. 1945.

Leslie Frazer (Seal) Acting Commissioner of Patents.

ing a plurality of radially outwardly projecting lugs extending into said openings, with the circumferential extremities of said lugs in driving engagement with the circumferential extremities of said legs and means defining stop members carried by said lugs and projecting into said opening within the radii of said substantially cylindrical wall, said stop members being adapted to coact with said closure for limiting the movement of said intermediate member away from said outer driving member.

5. A friction clutch comprising an outer driving member, a closure member, a substantially cylindrical wall bridging said driving member and closure member and constituting the outermost portion of the clutch, and an intermediate driving member interposed between said outer driving member and closure member and encompassed within said cylindrical wall, said cylindrical wall having a plurality of circumferentially spaced openings defining between them a plurality of legs, and said intermediate driving member having a plurality of radially outwardly projecting lugs extending into said openings, with the circumferential extremities of said lugs in driving engagement with the circumferential extremities of said legs, means defining stop members carried by said closure member and disposed radially within the confines of said cylindrical wall within said opening and effective to limit the movement of said intermediate member away from said outer driving member.

6. A friction clutch comprising an outer driving member, a closure member, a substantially cylindrical wall bridging said driving member and closure member and constituting the outermost portion of the clutch, and an intermediate driving member interposed between said outer driving member and closure member and encompassed within said cylindrical wall, said cylindrical wall having a plurality of circumferentially spaced openings defining between them a plurality of legs, and said intermediate driving member having a plurality of radially outwardly projecting lugs extending into said openings, with the circumferential extremities of said lugs in driving engagement with the circumferential extremities of said legs, and withdrawal springs received in said openings within the radii of said substantially cylindrical wall effective for moving said intermediate member away from said outer driving member.

LAWRENCE PERCY GODFREY.

---

CERTIFICATE OF CORRECTION.

Patent No. 2,366,610.     January 2, 1945.

LAWRENCE PERCY GODFREY.

It is hereby certified that error appears in the printed specification of the above numbered patent requiring correction as follows: Page 2, second column, line 31, claim 1, and line 47, claim 2, for "radically" read --radially--; and that the said Letters Patent should be read with this correction therein that the same may conform to the record of the case in the Patent Office.

Signed and sealed this 24th day of April, A. D. 1945.

Leslie Frazer (Seal)     Acting Commissioner of Patents.